US009310043B2

(12) United States Patent
Oguchi

(10) Patent No.: US 9,310,043 B2
(45) Date of Patent: Apr. 12, 2016

(54) VEHICLE TURN SIGNAL LIGHT DEVICE STRUCTURE HAVING A LIGHT SHIELDING PLATE

(71) Applicant: HONDA MOTOR CO., LTD., Tokyo (JP)

(72) Inventor: Tsuyoshi Oguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 139 days.

(21) Appl. No.: 13/925,828

(22) Filed: Jun. 25, 2013

(65) Prior Publication Data

US 2014/0078767 A1    Mar. 20, 2014

(30) Foreign Application Priority Data

Sep. 20, 2012  (JP) ................. 2012-206573

(51) Int. Cl.

| F21V 29/00 | (2015.01) |
|---|---|
| F21V 7/00 | (2006.01) |
| B60Q 1/00 | (2006.01) |
| B60Q 3/00 | (2006.01) |
| F21V 11/00 | (2015.01) |
| F21V 15/01 | (2006.01) |
| B62J 6/00 | (2006.01) |
| F21V 33/00 | (2006.01) |
| F21S 8/10 | (2006.01) |
| B60Q 1/04 | (2006.01) |
| B60Q 1/34 | (2006.01) |

(52) U.S. Cl.
CPC .............. *F21S 48/22* (2013.01); *B60Q 1/0041* (2013.01); *B60Q 1/04* (2013.01); *B60Q 1/34* (2013.01); *F21S 48/2212* (2013.01); *F21S 48/2218* (2013.01); *F21S 48/25* (2013.01)

(58) Field of Classification Search
CPC .......... B60Q 1/0047; B60Q 1/34; B60Q 1/38; B60Q 1/04; F21S 48/20; F21S 48/22; F21S 48/2218; F21S 48/2212; F21S 48/24; F21S 48/2243; F21W 2101/12; B62J 6/005; B62J 6/02
See application file for complete search history.

(56) References Cited

U.S. PATENT DOCUMENTS

| 4,855,877 A * | 8/1989 | Otaka ........................... 362/509 |
| 5,172,972 A * | 12/1992 | Terao ............................ 362/517 |
| 5,287,101 A * | 2/1994 | Serizawa ................. 340/815.76 |
| 5,546,284 A * | 8/1996 | Harada ......................... 362/487 |
| 5,735,591 A * | 4/1998 | Ruckwied ..................... 362/544 |
| 6,045,246 A * | 4/2000 | Goto ............................. 362/521 |
| 6,059,436 A * | 5/2000 | Hashigaya ................... 362/544 |

(Continued)

FOREIGN PATENT DOCUMENTS

WO    WO 2009/118998    10/2009

*Primary Examiner* — Jong-Suk (James) Lee
*Assistant Examiner* — Erin Kryukova
(74) *Attorney, Agent, or Firm* — Mori & Ward, LLP

(57) ABSTRACT

A vehicle light device structure includes a headlight, a blinker, a front cover, and a light shielding plate. The blinker includes a light source, a reflector, and a blinker lens. The light shielding plate is to block, among light emitted from the blinker, part of the light emitted towards the headlight. The blinker inner space is formed by fixedly supporting the blinker lens by the reflector. Part of the blinker inner space bulges to a more outer side than the second side in the front view and is covered by the front cover. The light shielding plate is arranged inside the blinker lens and is fixedly supported by a light shielding plate support part arranged in a bulging space which is the part of the blinker inner space.

14 Claims, 7 Drawing Sheets

(56) References Cited

U.S. PATENT DOCUMENTS

| | | | |
|---|---|---|---|
| 8,430,540 B2* | 4/2013 | Kikuchi | 362/343 |
| 8,454,075 B2* | 6/2013 | Hayashi et al. | 296/78.1 |
| 2007/0236949 A1* | 10/2007 | Kurihara | 362/475 |
| 2008/0192498 A1* | 8/2008 | Suita | 362/475 |

* cited by examiner

VEHICLE TURN SIGNAL LIGHT DEVICE STRUCTURE HAVING A LIGHT SHIELDING PLATE

CROSS-REFERENCE TO RELATED APPLICATIONS

The present application claims priority under 35 U.S.C. §119 to Japanese Patent Application No. 2012-206573, filed Sep. 20, 2012. The contents of this application are incorporated herein by reference in their entirety.

BACKGROUND OF THE INVENTION

1. Field of the Invention

The present invention relates to a vehicle light device structure.

2. Discussion of the Background

With configuration such that a headlight and a blinker are arranged adjacently to each other, in order to avoid overlapping of glares of both the blinker and the headlight, it may be desirable that a blinker irradiation range be adjusted.

Conventionally known as a technology of adjusting the blinker irradiation range is a structure such that a light shielding plate is extended integrally from a front cover and is arranged in a manner such as to overlap a blinker lens (see International Publication No. 2009/118998, FIG. 22, etc.).

SUMMARY OF THE INVENTION

According to one aspect of the present invention, a vehicle light device structure includes a headlight, a blinker, a front cover, and a light shielding plate. The blinker is arranged adjacently to the headlight. The blinker includes a light source, a reflector, and a blinker lens. The reflector is arranged behind the light source to reflect light from the light source to a front. The blinker lens is arranged in front of the light source and fixedly supported by the reflector. The front cover includes an opening part and covers surroundings of the blinker to expose the blinker lens to outside of the vehicle light device structure from the opening part. The light shielding plate is to block, among light emitted from the blinker, part of the light emitted towards the headlight. The blinker lens includes a blinker lens exterior part exposed to the outside in a front view of the vehicle light device structure. The blinker lens exterior part is located on a side of the headlight and includes a first side and a second side. The first side extends along an outline of the headlight. The second side extends from the first side to be away from the headlight and extends along an edge part of the opening part. The blinker inner space is formed by fixedly supporting the blinker lens by the reflector. Part of the blinker inner space bulges to a more outer side than the second side in the front view and is covered by the front cover. The light shielding plate is arranged inside the blinker lens and is fixedly supported by a light shielding plate support part arranged in a bulging space which is the part of the blinker inner space.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
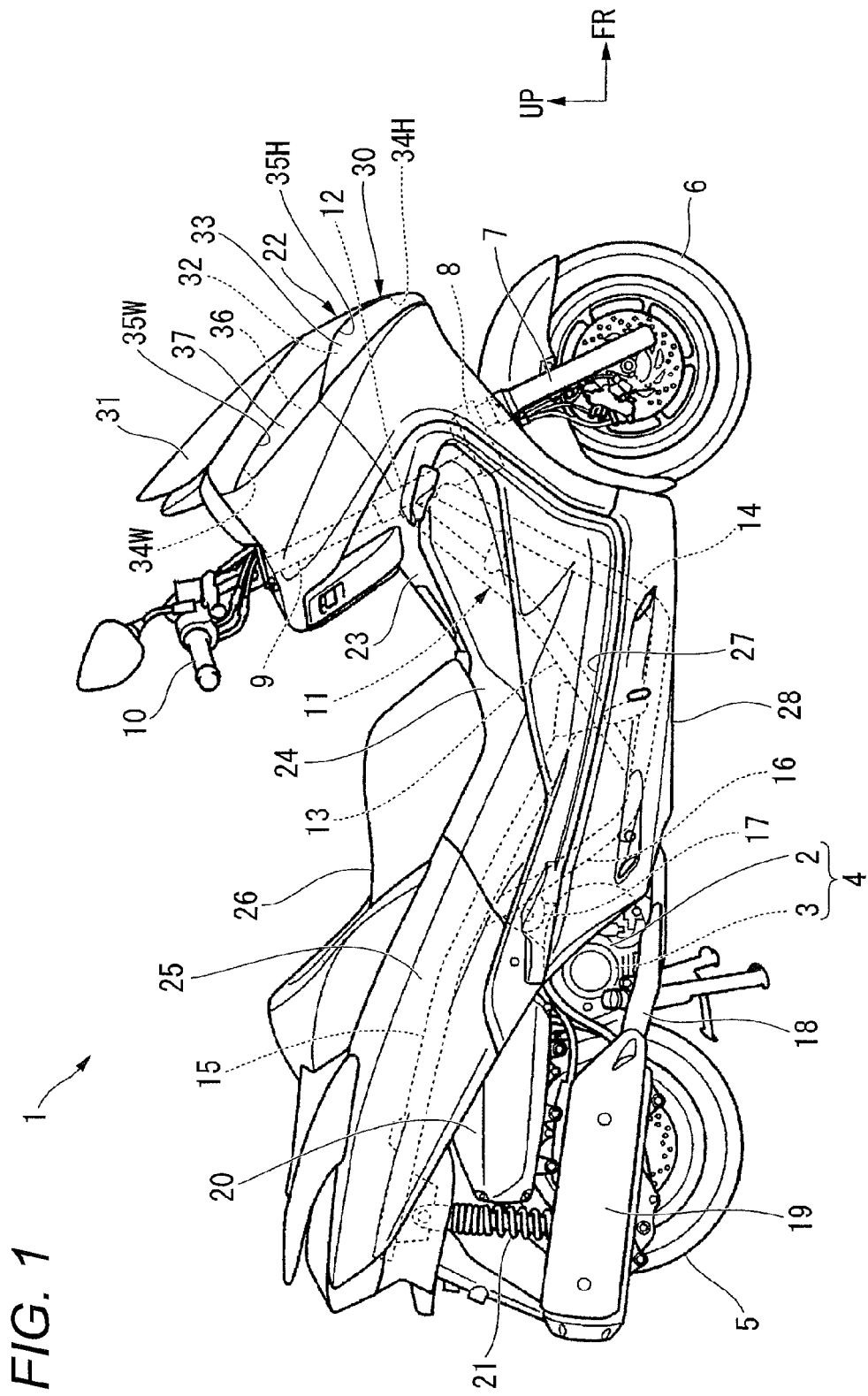
FIG. 1 is a right side view of a motorcycle applying a structure according to an embodiment.

The embodiments will now be described with reference to the accompanying drawings, wherein like reference numerals designate corresponding or identical elements throughout the various drawings.

In the drawings used below, an arrow FR indicates vehicle front, an arrow UP indicates vehicle top, and an arrow LH indicates vehicle left.

FIG. 1 shows a motorcycle 1 of a scooter-type applying a light device structure according to the embodiment, and this motorcycle 1 includes a swing unit 4 integrating an engine 2 and a power transmission mechanism 3. Behind the swing unit 4, a rear wheel 5 is turnably supported, and in front of the swing unit 4, a front wheel 6 is arranged. The front wheel 6 is turnably supported at bottom parts of a pair of right and left front forks 7, at top parts of which a bridge 8 is installed. At the bridge 8, a steering shaft 9 as a steering axis is provided in an upright posture.

Further above the steering shaft 9, a handlebar pipe 10 is provided, and the steering shaft 9 is turnably supported at a head pipe 12 of a body frame 11.

The body frame 11 includes: the head pipe 12; a pair of left and right main frames 13 that extend downwardly and rearwardly from a top part of the head pipe 12; a pair of left and right down frames 14 that extend downwardly and rearwardly from a bottom part of the head pipe 12, that are bent at a bottom part of the vehicle and extend rearwardly, and that are connected to rear ends of the main frames 13; a pair of left and right rear frames 15 that extend upwardly and rearwardly from rear parts of the main frames 13; and a pair of left and right rear support frames 16 that extend rearwardly and upwardly from rear parts of the down frames 14 and that are connected to the rear frames 15.

Fixed to top parts of the rear support frames 16 is an engine bracket 17 that protrudes rearwardly, and at this engine bracket 17, a front part of the swing unit 4 is turnably supported, whereby the swing unit 4 is capable of oscillating vertically. The swing unit 4 is of a cantilever type that extends in a longitudinal direction at a position offset to the left from a center in a vehicle width direction and that supports the rear wheel 5 at its rear part.

On the right of the rear wheel 5, a muffler 19 that is connected to an exhaust pipe 18 extending from the engine 2 is arranged, and between the muffler 19 and the rear frame 15, an air cleaner 20 is arranged. Moreover, between the rear wheel 5 and the rear frame 15, a cushion unit 21 is provided.

The motorcycle 1 is covered by a body cover formed of a plurality of cover members of, for example, synthetic resin, and in front of the steering shaft 9, a front cover 22 that is formed into a streamline shape tapered to the front in a top view is arranged. The front cover 22 covers the front and both sides of the steering shaft 9.

The front cover 22 opens to the rear, between right and left rear parts of the front cover 22, an inner cover 23 is provided, and a portion of the front cover 22 opening to the rear is closed by the inner cover 23. Then this inner cover 23 covers the steering shaft 9 from the rear.

Below the inner cover 23, a center cover 24 that extends in the longitudinal direction continues, and the center cover 24 mainly covers the main frames 13 and the down frames 14 from the top and both sides. At a rear end of the center cover 24, a pair of left and right rear side covers 25 continues, and these rear side covers 25 extend along the rear frames 15.

Above the center cover 24 and the rear side covers 25, a seat 26 where an occupant is seated is supported in a manner such as to stride over them. Left and right edge parts of the center cover 24 are located below the seat 26, and at these left and right edge parts, left and right step floor parts 27 that extend almost horizontally to an outer side in the vehicle width direction are formed. The step floor parts 27 are provided for the occupant seated on the seat 26 to put his or her feet thereon. Moreover, below the left and right step floor parts 27, a pair of left and right under cowls 28 is arranged, and the under cowls 28 extend in the longitudinal direction and cover bottom parts of the main frames 13 and the down frames 14 from both sides.

A front surface of the front cover 22 is formed into a sloped shape that extend rearwardly to the top in a side view, and at a top part of the front surface of the front cover 22, a screen 31 extends rearwardly to the top along the front cover 22. Moreover, at a bottom part of the front surface of the front cover 22, an opening part is formed, and through this opening part, headlights 30 are exposed to the outside.

Figure 2:
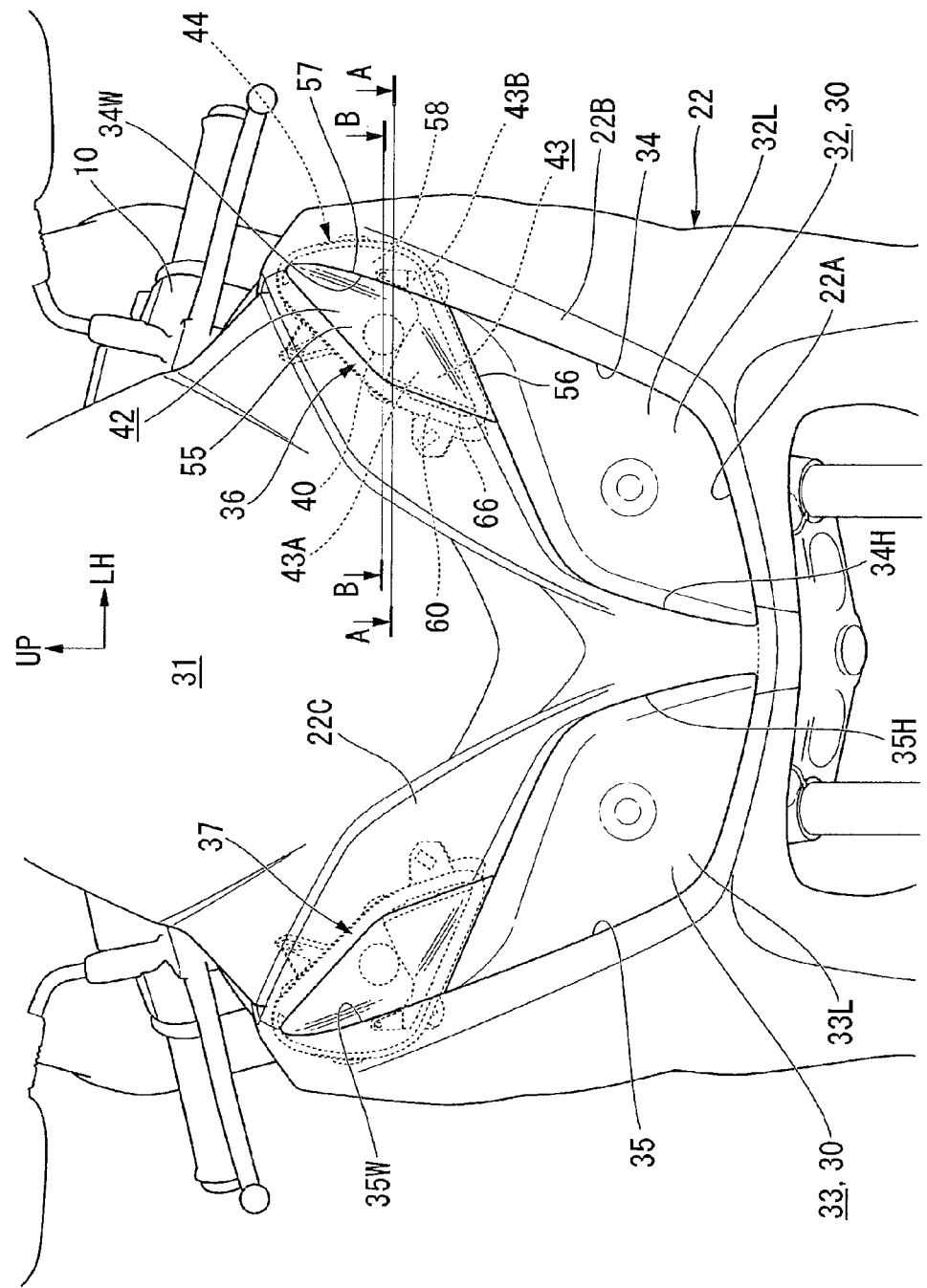
FIG. 2 is a front view of the motorcycle.

Referring to FIG. 2, in this embodiment, the headlights 30 include a left headlight 32 and a right headlight 33 provided in a pair on left and right sides, and defined (formed) at the front surface of the front cover 22 are: a left side opening part 34 that exposes the left headlight 32 to the outside and a right side opening part 35 that exposes the right headlight 33 to the outside.

In this embodiment, the front cover 22 is composed of: a cover body 22B that has a front wall and right and left side walls continuing to the front wall and also that is formed with at the front wall, a notch 22A gradually tapered to the front; and a garnish 22C that is formed into a substantially Y shape in a front view and that has each end part connected to left and right top edges and a front edge of the notch 22A to thereby form the left side opening part 34 and the right side opening part 35 in corporation with the cover body 22B.

The left side opening part 34 and the right side opening part 35 respectively include headlight regions 34H and 35H and blinker regions 34W and 35W, from the headlight region 34H of the left side opening part 34, the left headlight 32 is exposed to the outside, and from the blinker region 34W, a left blinker 36 is exposed to the outside. Moreover, from the headlight region 35H of the right side opening part 35, the right headlight 33 is exposed to the outside, and from the blinker region 35W, a right blinker 37 is exposed to the outside. Then the left headlight 32 and the left blinker 36 are arranged adjacently to each other in the left side opening part 34, and the right headlight 33 and the right blinker 37 are arranged adjacently to each other in the right side opening part 35.

Referring to FIGS. 1 and 2, the headlight regions 34H and 35H each extend along a shape of the front cover 22 rearwardly from a center side towards the outer side in the vehicle width direction, and also have an end part on the outer side of the vehicle width direction formed in a manner such as to be tilted up. Moreover, the headlight regions 34H and 35H each have an outline in a front view formed into a diamond shape upwardly and vertically extending from the center side towards the outer side in the vehicle width direction.

The blinker regions 34W and 35W respectively continue, above these headlight regions 34H and 35H, to the headlight regions 34H and 35H, and as shown in FIG. 1, extend upwardly to the rear while their own edge parts on the outer sides in the vehicle width direction extend along extension lines of edge parts of the headlight regions 34H and 35H on the outer sides in the vehicle width direction. These blinker regions 34W and 35W respectively extend along the shape of the front cover 22 rearwardly towards the outer side from the center side in the vehicle width direction, also have end parts on the outer sides in the vehicle width direction formed in a manner such as to be tilted up, and further each have an outline in a front view formed into a diamond shape upwardly and vertically extending from the center side towards the outer side in the vehicle width direction.

Referring to FIG. 2, the left headlight 32 and the right headlight 33 respectively have lenses 32L and 33L formed of, for example, transparent synthetic resin, and these lenses 32L and 33L are supported in the front cover 22 in a manner such as to be exposed to the outside from the headlight regions 34H and 35H in a state in which the lenses 32L and 33L range to be substantially flush with the outer surface of the front cover 22.

Portions of the lenses 32L and 33L exposed to the outside are in alignment with the headlight regions 34H and 35H, extend rearwardly from the center side towards the outer side in the vehicle width direction along the shape of the front cover 22, also have end parts on the outer sides in the vehicle width direction formed in a manner such as to be tilted up, and further each have an outline in a front view formed into a diamond shape upwardly and vertically extending from the center side towards the outer side in the vehicle width direction. Moreover, the lenses 32L and 33L are formed into an arc shape projected to the outer side in the vehicle width direction in a top view.

Moreover, the left headlight 32 and the right headlight 33 respectively include, inside of (behind) the lenses 32L and 33L: bulbs omitted from illustration; and reflectors that reflect light irradiated by the bulbs and distribute the light to the front, and that irradiate the light to the front through the lenses.

Hereinafter, detailed description of the right and left blinkers will be provided by description of the left blinker 36, and description of the right blinker 37 is omitted due to only a difference between the right and left sides.

Figure 3:
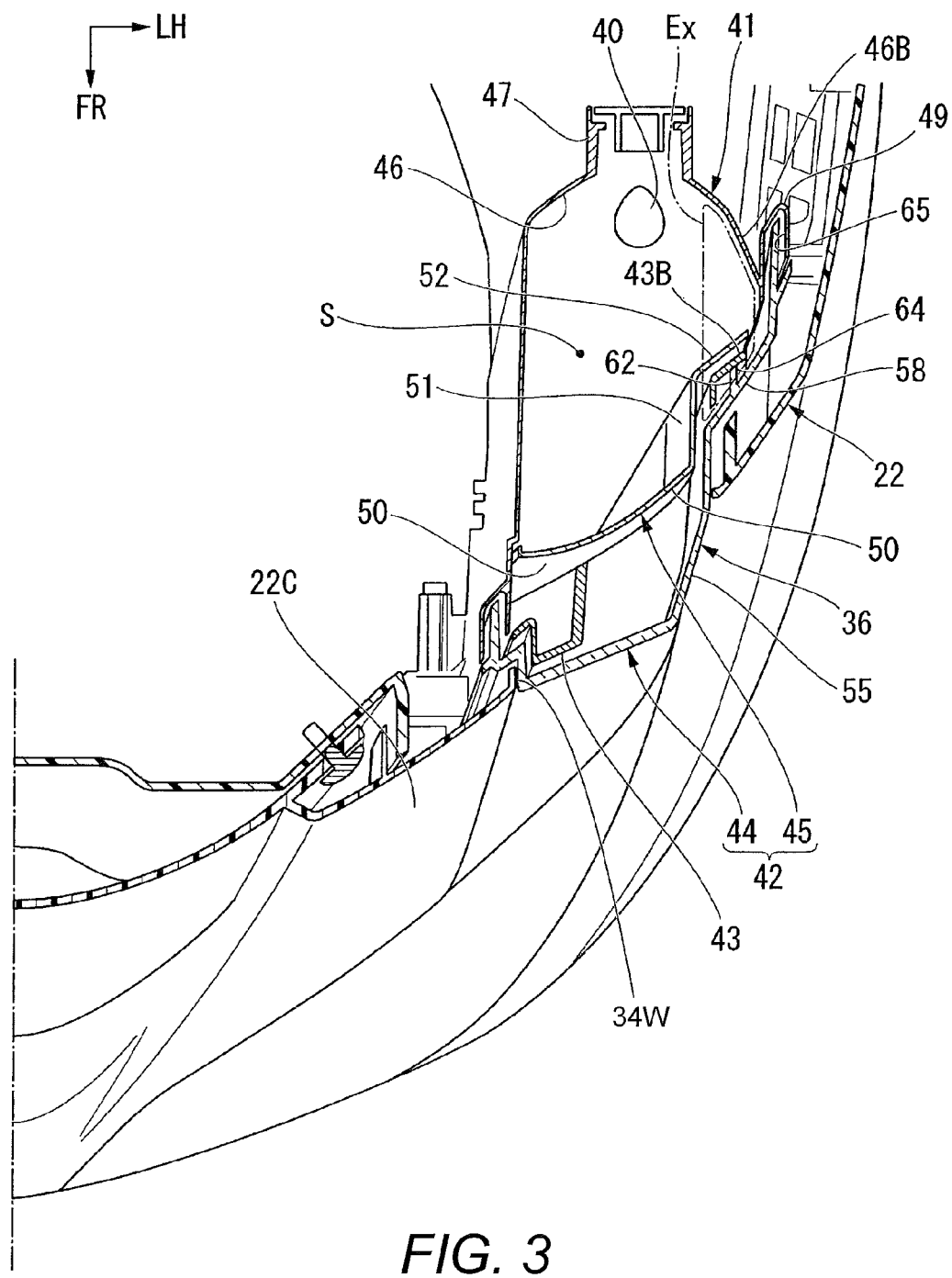
FIG. 3 is a sectional view taken along line A-A of FIG. 2.
Figure 4:
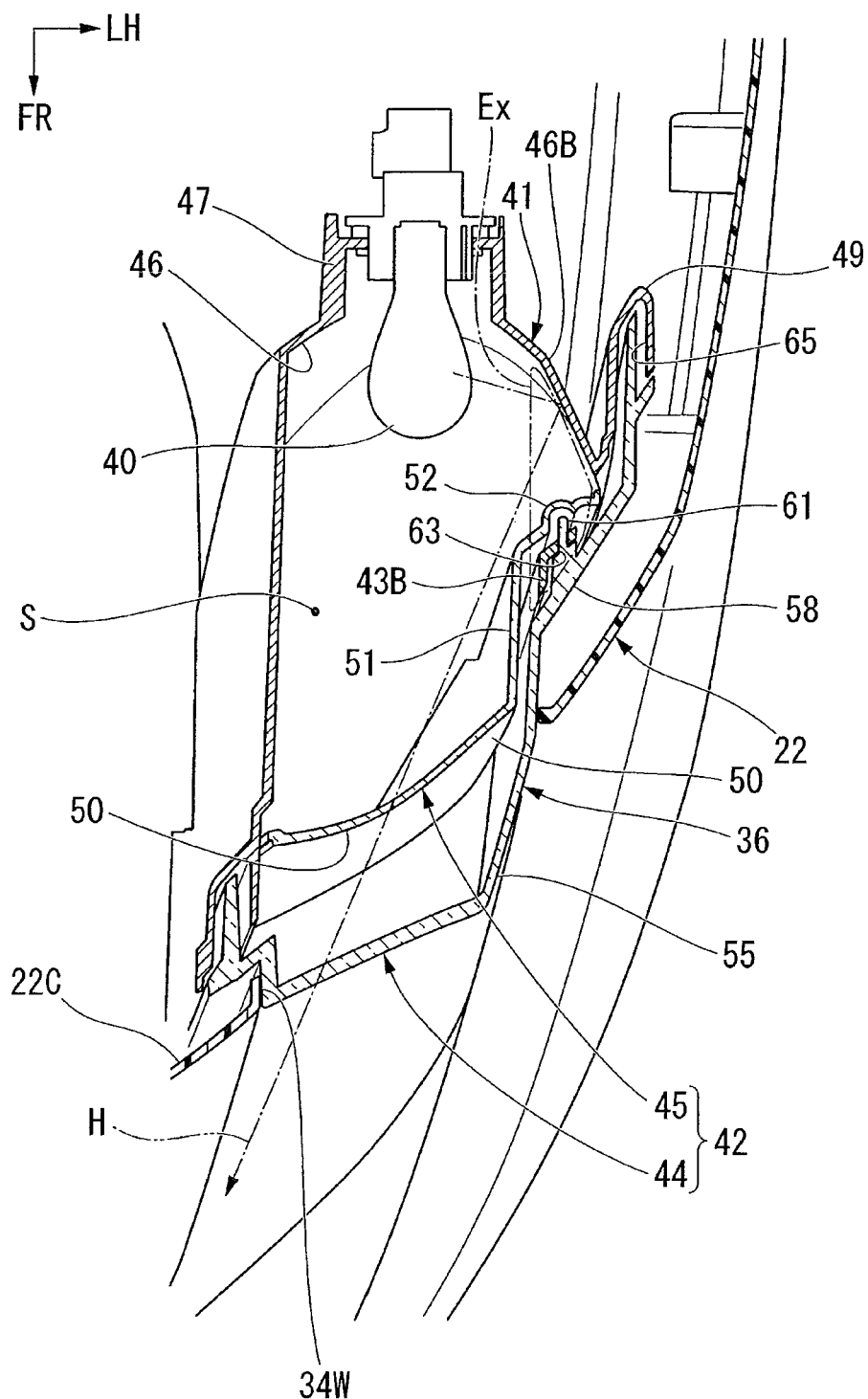
FIG. 4 is a sectional view taken along line B-B of FIG. 2.

Referring to FIGS. 2, 3, and 4, the left blinker 36 includes: a bulb 40 as a light source arranged inside of the front cover 22; a reflector 41 (see FIGS. 3 and 4) that is arranged behind the bulb 40 and also that reflects light of the bulb 40 to the front; a blinker lens 42 that is arranged in front of the bulb 40 and that is fixedly supported by the reflector 41; and a light shielding plate 43 that blocks, of light emitted from the blinker, part of the light emitted towards the left headlight 32.

As shown in FIGS. 3 and 4, in this embodiment, the blinker lens 42 is composed of: an outer lens 44 that partially exposes from the blinker region 34W to the outside; and an inner lens 45 that is arranged on an inner side of (behind) the outer lens 44. This left blinker 36 is supported on a body side in a state in which the bulb 40, the reflector 41, the blinker lens 42, and the light shielding plate 43 described above are integrally assembled.

Figure 5:
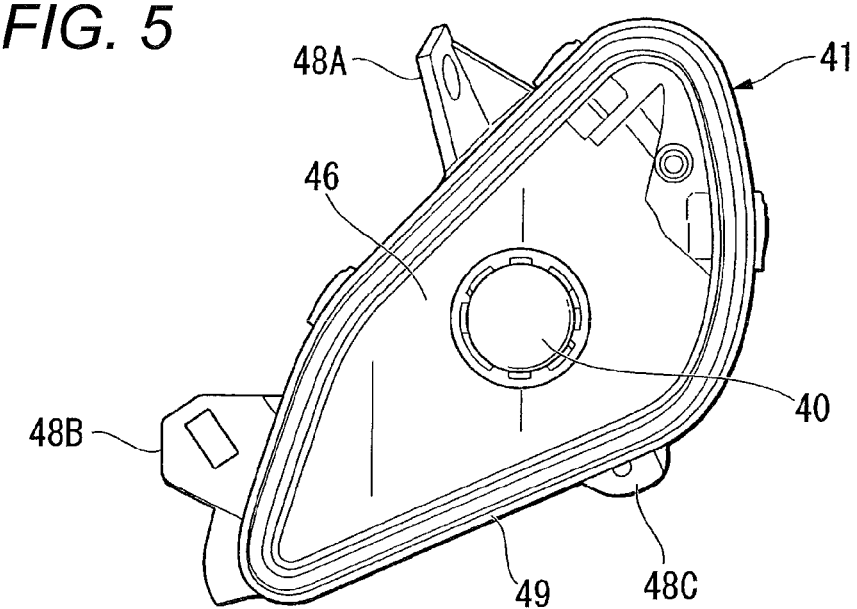
FIG. 5 is a front view of a reflector forming a blinker of the motorcycle.

FIG. 5 is a front view of the reflector 41, and the reflector 41 is formed in an elongated form and is arranged inside the front cover 22 in a manner such as to be along the blinker region 34W. As shown in FIGS. 3 and 4, the reflector 41 includes a reflection part 46 with a surface formed into a semicircular shape in cross section, the reflection part 46 has an inner surface subjected to mirror finishing and also has the inner surface arranged in a manner such as to face forward, as shown in FIG. 4, at a substantially vertical center position of the reflection part 46, a socket part 47 of a cylindrical shape that protrudes towards the rear is formed, and at this socket part 47, the bulb 40 is supported.

Here, in this embodiment, referring to FIGS. 2 and 4, part of a portion located on the outer side in the vehicle width direction at the reflection part 46 of the reflector 41 is covered by the front cover 22 in a front view. Hereinafter, of the portion located on the outer side in the vehicle width direction at the reflection part 46 of the reflector 41, the portion covered by the front cover 22 in a front view is called an in-cover intrusion part 46B.

Moreover, as shown in FIG. 5, at an opening edge (front edge) of the reflection part 46, a flange part 49 that extends across the whole periphery of the opening edge is formed in a manner such as to protrude towards the outer side, and at this flange part 49, three bracket parts 48A to 48C that protrude towards the outer side are formed. These bracket parts 48A to 48C are fastened to, for example, an inner surface of the front cover 22 whereby the left blinker 36 is supported to the front cover 22.

As shown in FIG. 4, the bulb 40 protrudes towards the front from the socket part 47, and is supported at the socket part 47 in a manner such that the reflection part 46 of the reflector 41 is located on a more rear side than a light emitting part of the bulb 40. As a result, the light irradiated by the bulb 40 is irradiated directly towards the front side and is also reflected by the reflection part 46 to be irradiated towards the front side.

Figure 6:
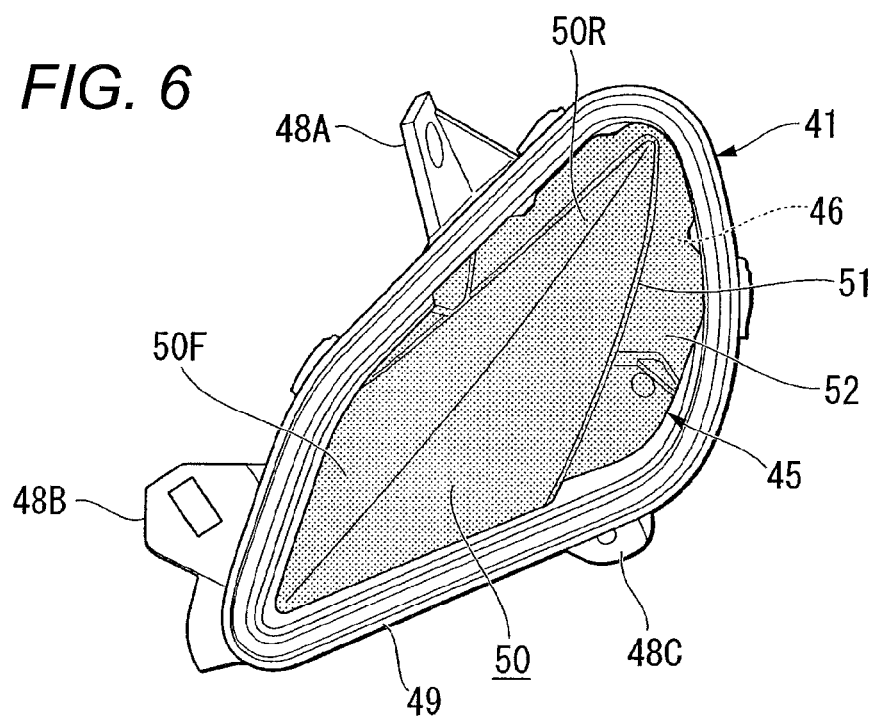
FIG. 6 is a front view of the reflector and an inner lens forming the blinker of the motorcycle in a state in which they are combined together.

Referring to FIGS. 3, 4, and 6, the inner lens 45 is colored transparent and is arranged in front of the bulb 40. The inner lens 45 is formed in an elongated form in a manner such as to be along the reflector 41, and is fixed with its outer circumferential edge being glued to an appropriate place on an inner circumferential edge side of the flange part 49 of the reflector 41 in a manner such as to cover the reflection part 46 of the reflector 41. In FIG. 6, for description convenience, the inner lens 45 is shown in dots.

As shown in FIGS. 3 and 4, the inner lens 45 has an inner lens exterior part 50 that is directed to the front through the blinker region 34W and that is exposed to the outside through the inner lens 45 in a front view, and referring to FIG. 6, this inner lens exterior part 50 extends rearwardly from the center side towards the outer side in the vehicle width direction, has an end part on an outer side in the vehicle width direction formed in a manner such as to be tilted up, and further has an outline in a front view formed into a flat rectangle extending in a vertically long form upwardly from the center side towards the outer side in the vehicle width direction. Moreover, the inner lens exterior part 50 is formed into an arc shape protruding to the outer side in the vehicle width direction in a top view.

A rear half part 50R extending in a manner tapered towards the rear in the inner lens exterior part 50 is separated from an opening edge of the reflection part 46 in the front view, and as shown in FIGS. 3 and 4, connected to an outer circumferential edge of this rear half part 50R is a collar wall part 52 that extends towards the opening edge of the reflection part 46 and that is located closely to or abuts on the opening edge. Referring to FIG. 6, a portion of the collar wall part 52 located on an inner side in the vehicle width direction is directly connected to the outer circumferential edge of the rear half part 50R and extends towards the inner side in the vehicle width direction, and a portion of the collar wall part 52 located on an outer side in the vehicle width direction is connected to the outer circumferential edge of the rear half part 50R via an extending wall part 51 that extends along an longitudinal direction.

Therefore, a portion on the outer side in the vehicle width direction at the outer circumferential edge of the rear half part 50R of the inner lens exterior part 50 is protruding to the front with respect to the opening edge of the reflector 41.

Moreover, the extending wall part 51 and the collar wall part 52 are covered by the front cover 22 and are not being exposed to the outside by the front cover 22 in a front view.

Moreover, it is preferable that, of the extending wall part 51 and the collar wall part 52, at least the collar wall part 52 be, for example, painted in black or be fitted with a sponge, a rubber sheet, or the like. In this case, for example, leak of light outwardly from the front cover 22, for example, towards the top can be suppressed.

Figure 7:
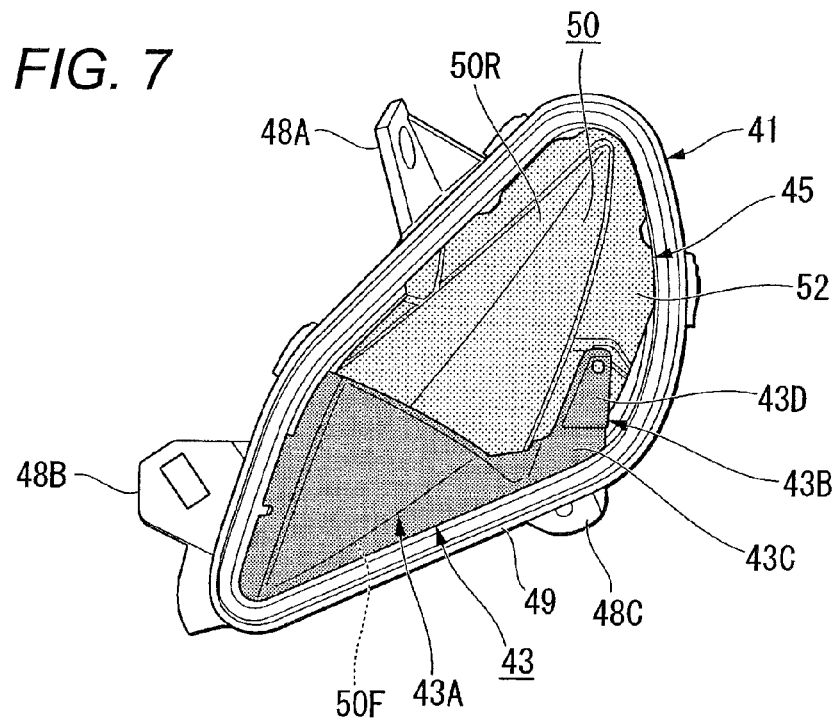
FIG. 7 is a front view of the reflector, the inner lens, and a light shielding plate forming the blinker of the motorcycle in a state in which they are combined together.

Referring to FIGS. 6 and 7, the light shielding plate 43 is arranged in front of a front half part 50F that extends in a manner tapered towards the front in the inner lens exterior part 50, has a light shielding plate main body 43A formed into a triangular shape in a front view in a manner such as to cover the entire front half part 50F, and by this light shielding plate main body 43A, light irradiated from the front half part 50F is blocked. That is, this light shielding plate main body 43A blocks the light irradiated from the bulb 40 and the reflector 41 towards the left headlight 32 or the front. In FIG. 7, for description convenience, the light shielding plate 43 is marked in dots.

Referring to FIG. 2, the light shielding plate main body 43A is located with one of three corner parts thereof extending along a corner part on a front end side of the blinker region 34W, and the almost whole is oriented to the front through the blinker region 34W. Then the light shielding plate 43 has, at, of the three corner parts of the light shielding plate main body 43A, the corner part located on the outer side in the vehicle width direction, a support stay 43B that extends to the outer side in the vehicle width direction in a state hidden by the front cover 22 therebehind.

Referring also to FIG. 7, the support stay 43B is formed integrally with the light shielding plate main body 43A, and is formed into an L shape having: a base part 43C that protrudes from the light shielding plate main body 43A towards the outer side in the vehicle width direction; and a tip part 43D that extends upwardly from a tip of the base part 43C along an outer edge of the blinker region 34W in the vehicle width direction. In FIG. 7, the light shielding plate 43 is illustrated along the inner lens 45, but they are not fixed directly to each other in this embodiment.

Figure 8:
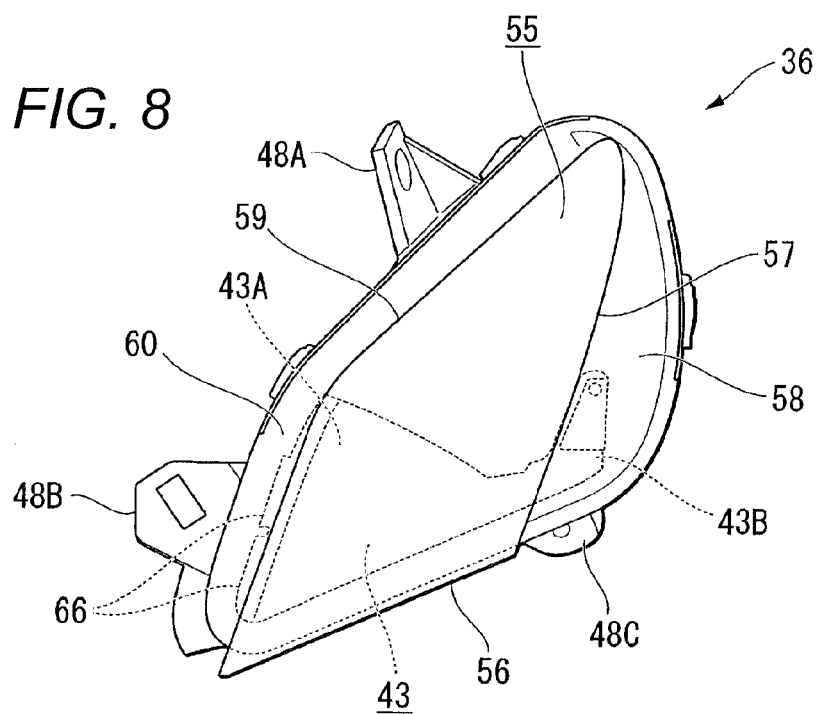
FIG. 8 is a front view of the blinker of the motorcycle.

Referring to FIGS. 2 and 8, the outer lens 44 is colorless transparent, is arranged in front of the inner lens 45 and the light shielding plate 43, and is formed in an elongated form in a manner such as to be along the reflector 41 and the inner lens 45. The outer lens 44 has: an outer lens exterior part 55 that is exposed to the outside through the blinker region 34W; and an outwardly bulging part 58 and an inwardly bulging part 60 that bulge from the outer lens exterior part 55.

The outer lens exterior part 55 has an exterior surface that extends rearwardly from the center side towards the outer side in the vehicle width direction, also has an end part on the outer side in the vehicle width direction formed in a manner such as to be tilted up, and further has an outline in a front view formed into a diamond shape that upwardly extends in a vertically long form from the center side towards the outer side in the vehicle width direction. Moreover, the outer lens exterior part 55 is formed into an arc shape projected to the outer side in the vehicle width direction in a top view.

Referring to FIGS. 2 and 8 together, the outer lens exterior part 55 has: a first side 56 that is located on a side of the left headlight 32 and that extends along the outline of the left headlight 32; a second side 57 that extends from the first side 56 in a manner such as to be away from the left headlight 32 and also that extends along an edge part on the outer side in the vehicle width direction in the headlight region 34H of the left side opening part 34; and an inner side 59 (FIG. 8) that makes connection between a front end of the first side 56 and a rear end of the second side 57.

The outwardly bulging part 58 is formed in a manner such as to bulge to the more outer side in the vehicle width direction than the second side 57 in a front view, and as shown in FIG. 2, the outwardly bulging part 58 is being covered by the front cover 22 in a front view. Moreover, the inwardly bulging part 60 is formed in a manner such as to bulge to a more inner side in the vehicle width direction than the inner side 59, and this inwardly bulging part 60 is also being covered by the front cover 22 in a front view.

In this embodiment, in a state in which the light shielding plate 43 is arranged inside (behind) the outer lens 44, its support stay 43B is fixedly supported at the outwardly bulging part 58 of the outer lens 44, whereby the light shielding plate 43 and the outer lens 44 are integrated, and in a state in which these light shielding plate 43 and outer lens 44 are integrated, they are fixed to the reflector 41, whereby the left blinker 36 is formed and then supported inside the front cover 22. Then as shown in FIG. 2, in this support state, the support stay 43B of the light shielding plate 43 and the outwardly bulging part 58 of the outer lens 44 are covered by the front cover 22 and thus are not exposed to the outside.

Referring to FIGS. 3 and 4, the integration of the light shielding plate 43 and the outer lens 44 will be described in detail. First, as shown in FIG. 4, at the outwardly bulging part 58 of the outer lens 44, a positioning protrusion part 61 protruding towards the rear is formed, and as shown in FIG. 3, a light shielding plate support part 62 located on a lower side than the positioning protrusion part 61 and protruding towards the rear is also formed.

On the contrary, as shown in FIG. 4, at the support stay 43B (tip part 43D) of the light shielding plate 43, a positioning hole 63 penetrating in an longitudinal direction is formed, and as shown in FIG. 3, at a portion located on a lower side than the positioning hole 63, a welding surface 64 is set.

Then in the integration of the light shielding plate 43 and the outer lens 44, the positioning protrusion part 61 is first inserted in the positioning hole 63 for positioning, the light shielding plate support part 62 brought into abutting contact with the welding surface 64 is next welded to this welding surface 64 through, for example, ultrasound welding. Then the fixation of the light shielding plate 43 and the outer lens 44 to the reflector 41 is performed by fixing appropriate places of the outwardly bulging part 58 and the inwardly bulging part 60 of the outer lens 44 to the flange part 49 of the reflector 41 through, for example, fastening by a screw or the like or ultrasound welding.

Here, in a case where the outer lens 44 integrated with the light shielding plate 43 is fixed, that is, fixedly supported by the reflector 41, as shown in FIGS. 3 and 4, a blinker inner space S as a closed space is formed inside of the outer lens 44 and the reflector 41.

Then in this embodiment, in a case where the left blinker is supported inside of the front cover 22, at the outer lens 44, the outwardly bulging part 58 bulging to the more outer side in the vehicle width direction than the second side 57 is covered by the front cover 22 in a front view. Moreover, the cover intrusion part 46B located on the outer side in the vehicle width direction in the reflection part 46 of the reflector 41 is covered by the front cover 22 in a front view. Thus, a portion located on the outer side in the vehicle width direction in the blinker inner space S formed by these outwardly bulging part 58 and in-cover intrusion part 46B bulges to the more outer side than the second side 57 in a front view and is also covered by the front cover 22.

Here, part of the blinker inner space S bulging to the more outer side than the second side 57 in a front view and also being covered by the front cover 22 is defined as a bulging space Ex (see FIGS. 3 and 4), and describing relationship between this bulging space Ex and the light shielding plate support part 62, the light shielding plate support part 62 is arranged in the bulging space Ex and in this embodiment, is formed at the outwardly bulging part 58 of the outer lens 44.

Moreover, referring to FIGS. 3 and 4, in a state in which the light shielding plate 43 and the outer lens 44 are integrated and they are fixed to the reflector 41, the outwardly bulging part 58 of the outer lens 44 and the support stay 43B of the light shielding plate 43 are covered from the inner side in the vehicle width direction by the extending wall part 51 in the inner lens 45 and are covered from the rear by the collar wall part 52, and further the inner lens exterior part 50 is located on a more front side than the positioning protrusion part 61 of the outwardly bulging part 58, etc.

Moreover, the in-cover intrusion part 46B of the reflection part 46 of the reflector 41 having a sectional surface formed into a semicircular shape is so formed as to be located behind the outwardly bulging part 58 of the outer lens 44 and the support stay 43B of the light shielding plate 43. In this embodiment, by this in-cover intrusion part 46B, as referred to as an arrow H (indicated by a two-dotted line) shown in FIG. 4, light distribution to the inner side in the vehicle width direction is performed.

Further, at the flange part 49 of the reflector 41, a receiving part 65 of a U shape in cross section which opens to the front is formed, and with this receiving part 65, a rear end part of the outwardly bulging part 58 of the outer lens 44 engages. Provision of such an engagement part eases operation of firmly attaching the light shielding plate 43 and the outer lens 44 to the reflector 41.

Moreover, in the integration of the light shielding plate 43 and the outer lens 44 as described above, the light shielding plate support part 62 brought into abutting contact with the welding surface 64 is welded to this welding surface 64, but as shown in FIG. 8, in this embodiment, in a front view, at an edge part of the light shielding plate main body 43A on the inner side in the vehicle width direction, a projection 66 is formed which protrudes to a more outer side than the inner side 59 of the outer lens exterior part 55 and which is covered by the front cover 22 as shown in FIG. 2. Then in this embodiment, for the purpose of reinforcement of the light shielding plate support part 62, this projection 66 is welded to the inwardly bulging part 60 in the outer lens 44. Note that the outwardly bulging part 58 and the inwardly bulging part 60 of the outer lens 44 are preferably painted in black or fitted with a sponge, a rubber sheet, or the like. In this case, leak of light outwardly from the front cover 22, for example, to the top can be suppressed Included in the motorcycle 1 of this embodiment described above are: the left headlight 32; the left blinker 36 that is arranged adjacently to the left headlight 32 and that includes the bulb 40 as a light source, the reflector 41 arranged behind the bulb 40 and reflecting light of the bulb 40 to the front, and the outer lens 44 corresponding to a blinker lens arranged in front of the bulb 40 and also fixedly supported by the reflector 41; the front cover 22 that is formed with the left side opening part 34 as an opening part and that covers surroundings of the left blinker 36 in a manner such as to expose the outer lens 44 to the outside from this left side opening part 34; and the light shielding plate 43 that blocks, of light emitted from the left blinker 36, part of the light emitted towards the left headlight 32.

Then of the outer lens 44, the outer lens exterior part 55 exposed to the outside in a front view has: the first side 56 that is located on the side of the left headlight 32 and also that extends along the outline of the headlight; and the second side 57 that extends from the first side 56 in a manner such as to be away from the left headlight 32 and also that extends along the edge part of the left side opening part 34, part of the blinker inner space S formed by fixedly supporting the outer lens 44 by the reflector 41 bulges to the more outer side than the second side 57 in a front view and is also covered by the front cover 22, and the light shielding plate 43 is arranged inside of the outer lens 44 and is also fixedly supported by the light shielding plate support part 62 arranged in the bulging space Ex as part of the blinker inner space S that bulges to the more outer side than the second side 57 in a front view and also that is covered by the front cover 22.

With such a structure, as a result of arranging the light shielding plate 43 inside of the outer lens 44, exterior shapes of the front cover 22 and the outer lens 44 are not affected by, for example, a shape of the light shielding plate 43, and therefore, light volume and light distribution of the left blinker 36 can be changed by the light shielding plate 43 while the exterior shapes of the front cover 22 and the outer lens 44 are left intact. This can avoid a change in the exterior shapes of the front cover 22 and the left blinker 36 due to the shape or installation of the light shielding plate 43 and also can reduce costs required for adjusting, for example, the light volume and the light distribution of the left blinker 36 by the light shielding plate 43.

Moreover, the bulging space Ex as part of the blinker inner space S formed by fixedly supporting the outer lens 44 by the reflector 41 bulges to the more outer side than the second side 57 in a front view and is also covered by the front cover 22, and the light shielding plate 43 is fixedly supported by the light shielding plate support part 62 arranged in the bulging space Ex, and the light shielding plate support part 62 is not exposed to the exterior when viewed from the front, which can ensure favorable appearance quality.

Moreover, in this embodiment, the light shielding plate support part 62 is provided in the outer lens 44, and compared to a case where the light shielding plate support part is provided in the reflector 41, the light shielding plate support part 62 is hardly viewed, which can ensure more favorable appearance quality. Moreover, in a case of light distribution by the reflector 41, the light shielding plate support part 62 does not become an obstacle, thus making it possible to easily perform light distribution design. The light shielding plate support part 62 may be a projecting part for welding as in this embodiment but may be, for example, of a cylindrical shape for screw fastening, and its shape and a way of the fixation support are not specifically limited.

Moreover, in this embodiment, the left blinker 36 is arranged in a vertically long form on the left headlight 32 in a front view, the exterior surface of the outer lens exterior part 55 of the outer lens 44 is obliquely formed in a manner such as to extend rearwardly towards the outer side in the vehicle width direction, its second side 57 is defined at a portion of the outer lens exterior part 55 located on the outer side in the vehicle width direction, the bulging space Ex bulges to the outer side in the vehicle width direction, part of the light emitted from the bulb 40 is reflected by the in-cover intrusion part 46B of the reflector 41, the in-cover intrusion part 46B bulging to the more outer side than the second side 57 in a front view, being covered by the front cover 22, and forming the bulging space Ex, and the light is distributed towards the inner side in the vehicle width direction.

In this case, while realizing the blinker shape that permits air resistance reduction by providing characteristic appearance as a result of formation into a vertically long shape and by the rearward extension to the outer side in the vehicle width direction, light distribution to the inner side in the vehicle width direction that is disadvantageous in terms of its shape can be assisted by the cover intrusion part 46B of the reflector 41.

Moreover, in this embodiment, the outer lens 44 is colorless transparent, the left blinker 36 further includes, between the bulb 40 and the outer lens 44, the inner lens 45 being colored transparent, the inner lens exterior part 50 of the inner lens 45 is arranged in a manner such as to be located on a more front side than the light shielding plate support part 62, and the exterior part of the colored inner lens 45 is arranged on a more front side than the light shielding plate support part, which therefore makes it more difficult to view the light shielding part and ensure more favorable appearance quality.

Moreover, in this embodiment, the inner lens 45 is arranged on a more rear side than the light shielding plate 43 and is fixedly supported by the reflector 41. In this case, fixedly supporting the inner lens 45 at the reflector 41 and the light shielding plate 43 at the outer lens 44 and then combining together the reflector 41 and the outer lens 44 permits linking of the reflector 41, the inner lens 45, the light shielding plate 43, and the outer lens 44, which can therefore achieve simplification of an assembly man hour.

Description of the right blinker 37 is omitted but the same effects described above can be provided.

Next, referring to FIG. 9, a modified embodiment of the embodiment described above will be described. In this example, the light shielding plate 43 and the outer lens 44 are attached to each other through screwing. The same configuration as that of the embodiment described above are provided with the same reference signs and is omitted from the description.

Figure 9:
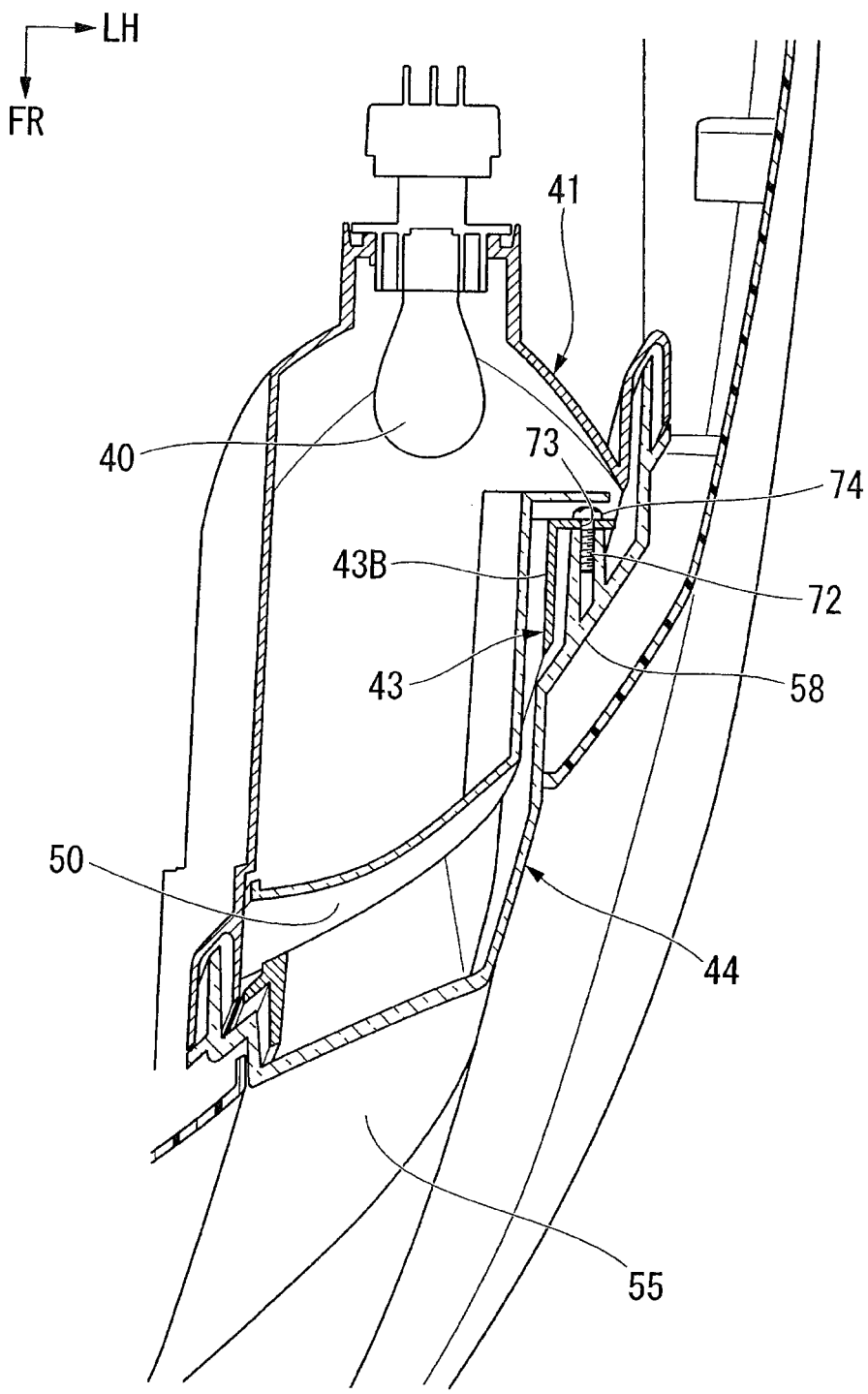
FIG. 9 is a sectional view showing a modification of the above embodiment.

As shown in FIG. 9, in this example, at the outwardly bulging part 58 of the outer lens 44, a boss 72 of a cylindrical shape protruding to the rear is formed. On the contrary, at the tip part of the support stay 43B of the light shielding plate 43, a through hole 73 penetrating in a longitudinal direction is formed.

Then through the through hole 73, a screw 74 is inserted from the rear, and this screw 74 is screwed into inner circumference of the boss 72.

Here, the boss 72 described above corresponds to the light shielding plate support part in the present disclosure, but such a light shielding plate support part is not specifically limited, and it may be screwed as in this example or welded as in the embodiment described above, as long as it can support the light shielding plate 43.

The embodiment of the present invention has been described above, but the present invention is not limited to the embodiment described above, and various modifications can be made within a range not departing from the spirits of the invention.

For example, described in the embodiment above is configuration such that the light shielding plate 43 is supported at the outwardly bulging part 58 of the outer lens 44, but a bulging part which bulges to the more outer side than the second side 57 may be formed at the reflector 41 and the light shielding plate 43 may be supported at it. That is, the bulging part in this case, in the embodiment described above, corresponds to the in-cover intrusion part 46B, and the light shielding plate support part may be provided at this in-cover intrusion part 46B.

Moreover, an example in which the blinker lens 42 is composed of the outer lens 44 and the inner lens 45 has been described, but it may not be the inner lens 45.

Further, an example in which the left and right blinkers 36 and 37 are respectively adjacent to the left and right headlights 32 and 33 from above has been described, but configuration such that they are adjacent from below is also permitted.

Moreover, an example in which the headlight 30 is composed of a pair of the left headlight 32 and the right headlight 33 has been described, but it may be a single one. Moreover, a lens shape and a blinker shape of each of the left headlight 32 and the right headlight 33 may be different from those of the embodiment described above.

Moreover, in the embodiment described above, the outer lens 44 is described as being colorless transparent, but may be colored transparent paler than the inner lens 45.

A vehicle light device structure according to a first aspect of the embodiment includes: a headlight (32); a blinker (36) being arranged adjacently to the headlight (32), the blinker (36) including: a light source (40), a reflector (41) being arranged behind the light source (40) and also reflecting light of the light source (40) to the front, and a blinker lens (44) being arranged in front of the light source (40) and also being fixedly supported by the reflector (41); a front cover (22) being formed with an opening part (34) and covering surroundings of the blinker (36) in a manner such as to expose the blinker lens (44) to outside from the opening part (34); and a light shielding plate (43) blocking, of light emitted from the blinker (36), part of the light emitted towards the headlight (32), wherein of the blinker lens (44), a blinker lens exterior part (55) exposed to the outside in a front view is located on a side of the headlight (32) and has: a first side (56) extending along an outline of the headlight (32), and a second side (57) extending from the first side (56) in a manner such as to be away from the headlight (32) and also extending along an edge part of the opening part (34), part of a blinker inner space (S) formed by firmly supporting the blinker lens (44) by the reflector (41) bulges to a more outer side than the second side (57) in the front view and is covered by the front cover (22), and the light shielding plate (43) is arranged inside the blinker lens (44), and is also fixedly supported by a light shielding plate support part (62) arranged in a bulging space (Ex) as part of the blinker inner space (S) bulging to the more outer side than the second side (57) in the front view and also being covered by the front cover (22).

A vehicle light device structure according to a second aspect of the embodiment is the vehicle light device structure according to the first aspect, wherein the light shielding plate support part (62) is provided at the blinker lens (44).

A vehicle light device structure according to a third aspect of the embodiment is the vehicle light device structure according to the first or second aspect, wherein the blinker (36) is arranged in a vertically long form on or under the headlight (32) in the front view, an exterior surface of the blinker lens exterior part (55) of the blinker lens (44) is obliquely formed in a manner such as to extend rearwardly towards an outer side in a vehicle width direction, the second side (57) is defined by a portion of the blinker lens exterior part (55) of the blinker lens (44) located on an outer side in the vehicle width direction, and the bulging space (Ex) bulges towards the outer side in the vehicle width direction, and part of light emitted from the light source (40) is reflected by an in-cover intrusion part (46B) of the reflector (41), and is distributed towards an inner side in the vehicle width direction, the in-cover intrusion part (46B) bulging to a more outer side than the second side (57) in a front view, being also covered by the front cover (22), and forming the bulging space (Ex).

A vehicle light device structure according to a fourth aspect of the embodiment is the vehicle light device structure according to any one of the first to third aspects, wherein the blinker (36) further includes, between the light source (40) and the blinker lens (44), an inner lens (45) being colored transparent, the blinker lens (44) is colorless transparent or colored transparent paler than the inner lens (45), and of the inner lens (45), an inner lens exterior part (50) exposed to outside in the front view is arranged in a manner such as to be located on a more front side than the light shielding plate support part (62).

A vehicle light device structure according to a fifth aspect of the embodiment is the vehicle light device structure according to the fourth aspect, wherein the light shielding plate support part (62) is provided at the blinker lens (44), and the inner lens (45) is arranged on a more rear side than the light shielding plate (43) and is fixedly supported by the reflector (41).

According to the first aspect of the embodiment, as a result of arranging the light shielding plate inside the blinker lens, the exterior shapes of the front cover and the blinker lens cannot be affected by, for example, the shape of the light shielding plate, and thus the blinker light volume and light distribution can be changed by the light shielding plate while the exterior shapes of the front cover and the blinker lens are left intact. This can avoid the change in the exterior shapes of the front cover and the blinker due to the installation or the shape of the light shielding plate, and can also reduce costs required for adjusting, for example, the light volume and light distribution by the light shielding plate.

Moreover, the bulging space as part of the blinker inner space formed by firmly supporting the blinker lens by the reflector bulges to the more outer side than the second side in the front view and is also covered by the front cover, the light shielding plate is fixedly supported by the light shielding plate support part arranged in the bulging space, and the light shielding plate support part is not exposed to the exterior when viewed from front, thus making it possible to ensure favorable appearance quality.

According to the second aspect of the embodiment, compared to a case where the light shielding plate support part is provided at the reflector, the light shielding plate support part is hardly viewed, thus making it possible to ensure even more favorable appearance quality.

Moreover, in a case of light distribution by the reflector, the light shielding plate support part does not become an obstacle, thus making it possible to easily perform light distribution design.

According to the third aspect of the embodiment, providing a vertically long blinker to provide its characteristic appearance and also extending this lens appearance part rearwardly towards an outer side in the vehicle width direction makes it possible to, while realizing a blinker shape capable of reducing air resistance, assist light distribution to the inner side in the vehicle width direction, which is disadvantageous in terms of its shape, by an in-cover intrusion part of the reflector.

According to the fourth aspect of the embodiment, the exterior part of the colored inner lens is arranged on the more front side than the light shielding plate support part, and thus the light shielding plate support part can be even more hardly viewed and even more favorable appearance quality can be ensured.

According to the fifth aspect of the embodiment, firmly supporting the inner lens at the reflector and the light shielding plate at the blinker lens and then combining together the reflector and the blinker lens makes it possible to link together the reflector, the inner lens, the light shielding plate, and the blinker lens and thus achieve simplification of an assembly man hour.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle light device structure comprising:
   a headlight;
   a blinker arranged adjacently to the headlight, the blinker comprising:
      a light source;
      a reflector arranged behind the light source to reflect light from the light source to a front of the vehicle;
      an outer lens arranged in front of the light source and fixedly supported by the reflector; and
      an inner lens;
   a front cover including an opening part and covering surroundings of the blinker to expose the outer lens to outside of the vehicle light device structure from the opening part; and
   a light shielding plate to block, among light emitted from the blinker, part of the light emitted towards the headlight, the outer lens including an outer lens exterior part exposed to the outside in a front view of the vehicle light device structure, the outer lens exterior part being located on a side of the headlight and including a first side and a second side, the first side extending along an outline of the headlight, the second side extending from the first side to be away from the headlight and extending along an edge part of the opening part, a blinker inner space being formed by fixedly supporting the outer lens by the reflector, part of the blinker inner space bulging to a more outer side of the vehicle than the second side in the front view and being covered by the front cover so as to form a bulging space disposed in front of the reflector in a direction toward the front of the vehicle, the light shielding plate being arranged inside the outer lens and being fixedly supported by a light shielding plate support part arranged in the bulging space which is the part of the blinker inner space,
   wherein a portion of the light shielding plate is disposed between the inner lens and the outer lens in the direction toward the front of the vehicle and in the bulging space, the portion of the light shielding plate being disposed in the bulging space.

2. The vehicle light device structure according to claim 1, wherein the light shielding plate support part is provided at the outer lens.

3. The vehicle light device structure according to claim 1, wherein the blinker is arranged in a vertically long form on or under the headlight in the front view,
   wherein an exterior surface of the outer lens exterior part of the outer lens is obliquely formed to extend rearwardly towards an outer side in a vehicle width direction,
   wherein the second side is defined by a portion of the outer lens exterior part of the outer lens located on an outer side in the vehicle width direction, and the bulging space bulges towards the outer side in the vehicle width direction, and
   wherein part of light emitted from the light source is reflected by an in-cover intrusion part of the reflector and is distributed towards an inner side in the vehicle width direction, the in-cover intrusion part bulging to a more outer side than the second side in the front view and being covered by the front cover, the in-cover intrusion part forming the bulging space.

4. The vehicle light device structure according to claim 1, wherein the inner lens is provided between the light source and the outer lens and is colored transparent,
   wherein the outer lens is colorless transparent or colored transparent paler than the inner lens, and
   wherein the inner lens includes an inner lens exterior part exposed to outside in the front view and arranged to be located on a more front side than the light shielding plate support part.

5. The vehicle light device structure according to claim 4, wherein the light shielding plate support part is provided at the outer lens, and
   wherein the inner lens is arranged on a more rear side than the light shielding plate, and the light shielding plate is fixedly supported by the reflector.

6. The vehicle light device structure according to claim 1, wherein the light shielding plate includes
   a light shielding plate main body to block the part of the light emitted towards the headlight, and
   a support stay extending from the light shielding plate main body into the bulging space, the support stay being supported by the light shielding plate support part.

7. The vehicle light device structure according to claim 6, wherein the support stay includes
   a base part protruding from the light shielding plate main body into the bulging space, and
   a tip part extending upwardly from a tip of the base part and provided in the bulging space, the tip part being supported by the light shielding plate support part.

8. The vehicle light device structure according to claim 1, wherein the first side extends in a direction that is parallel to an upper portion of the outline of the headlight.

9. The vehicle light device structure according to claim 1, wherein the light shielding plate support part is a part of the outer lens, the light shielding plate support part being in abutting contact with the outer lens.

10. The vehicle light device structure according to claim 1, wherein the bulging space is disposed outward in a vehicle width direction relative to the light source.

11. The vehicle light structure according to claim 1, wherein a portion of the inner lens is disposed in the bulging space behind the light shielding plate and in front of the reflector when viewed from the front of the vehicle.

12. The vehicle light structure according to claim 11, wherein the portion of the inner lens in the bulging space is disposed directly between the light shielding plate and the reflector in a direction toward a rear of the vehicle from the front of the vehicle.

13. A vehicle light device structure comprising:
    a headlight;
    a blinker arranged adjacently to the headlight, the blinker comprising:
       a light source;

a reflector arranged behind the light source to reflect light from the light source to a front of the vehicle;
an outer lens arranged in front of the light source and fixedly supported by the reflector; and
an inner lens;
a front cover including an opening part and covering surroundings of the blinker to expose the outer lens to outside of the vehicle light device structure from the opening part; and
a light shielding plate to block, among light emitted from the blinker, part of the light emitted towards the headlight, the light shielding plate having a light shielding plate main body and a support stay, the outer lens including an outer lens exterior part exposed to the outside in a front view of the vehicle light device structure, the outer lens exterior part being located on a side of the headlight and including a first side and a second side, the first side extending along an outline of the headlight, the second side extending from the first side to be away from the headlight and extending along an edge part of the opening part, a blinker inner space being formed by fixedly supporting the outer lens by the reflector, part of the blinker inner space bulging to a more outer side of the vehicle than the second side in the front view and being covered by the front cover so as to form a bulging space, the light shielding plate being arranged inside the outer lens and being fixedly supported by a light shielding plate support part arranged in the bulging space which is the part of the blinker inner space, wherein the light shielding plate main body and the support stay are disposed at opposing positions relative to the second side.

14. The vehicle light structure according to claim 13, wherein the support stay has a tip part provided in the bulging space, the tip part being supported by the light shielding plate support part, the tip part being disposed between the inner lens and the outer lens.

* * * * *